No. 834,611. PATENTED OCT. 30, 1906.
O. J. GARLOCK.
GASKET.
APPLICATION FILED MAY 24, 1906.

Attest:
A. M. Whitmore.
J. A. Geiger.

Inventor:
O. J. Garlock,
by E. B. Whitmore, Atty

THE NORRIS PETERS CO., WASHINGTON, D. C.

UNITED STATES PATENT OFFICE.

OLIN J. GARLOCK, OF PALMYRA, NEW YORK.

GASKET.

No. 834,611.	Specification of Letters Patent.	Patented Oct. 30, 1906.

Application filed May 24, 1906. Serial No. 318,522.

*To all whom it may concern:*

Be it known that I, OLIN J. GARLOCK, of Palmyra, in the county of Wayne and State of New York, have invented a new and useful Improvement in Gaskets, which improvement is fully set forth in the following specification and shown in the accompanying drawings.

My present invention relates to machinery-packing generally, it being designed more particularly for packing large openings, such as manholes of steam-boilers and similar openings.

The invention is an improved rope of packing material and gaskets formed therefrom, the rope being made up of strands or members of india-rubber, fiber, and flexible metal, with the latter free to move endwise within the wrapper, the invention also consisting in part in the manner of forming and securing the joint at the abutting ends of the section of the rope when bent to form a ring of packing or gasket.

The objects and advantages of the invention will be brought out and made to appear in the following description, reference being had to the accompanying drawings, which, with the reference-numerals marked thereon, form a part of this specification.

Figure 1:
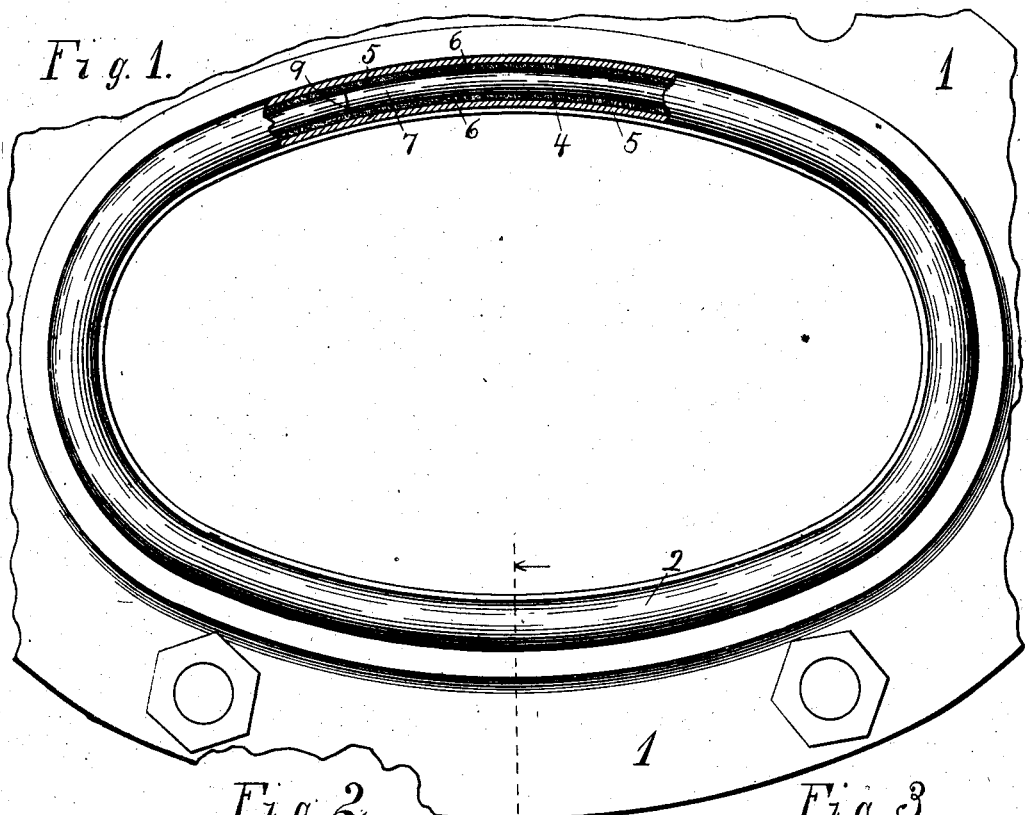
Figure 2:
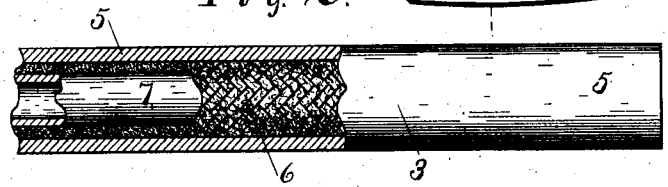
Figure 3:
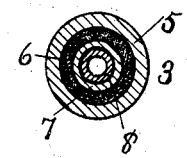
Figure 4:
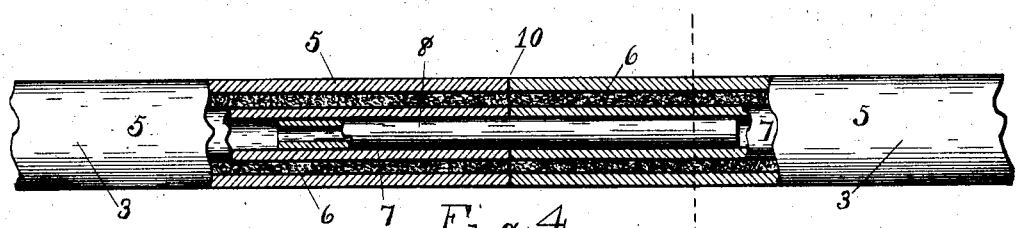
Figure 5:
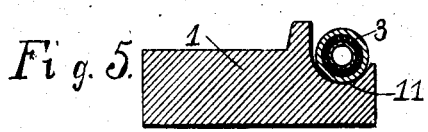

Referring to the drawings, Figure 1 shows in plan a manhole plate or casting with my improved gasket in place thereon, parts being broken away and other parts axially sectioned. Fig. 2 shows a portion of the rope with parts broken away and longitudinally sectioned through the axis of the rope. Fig. 3 is a transverse section of the rope, taken as on the dotted line in Fig. 4. Fig. 4 shows portions at the joined ends of the rope, as in forming a gasket, with parts broken away and centrally longitudinally sectioned, showing a connecting member or connector for the ends of the rope. Fig. 5 is a transverse section at one side of the manhole-casting, taken on the dotted line in Fig. 1, showing the gasket in cross-section.

Referring to the parts shown, 1 is a manhole plate or casting of ordinary form and struction or such as is commonly employed with steam-boilers, 2 being my improved packing-gasket in place thereon. This gasket is made from a section or piece of rope 3, of packing material, of the proper length by bending the same to the form of the manhole required to be packed. The manhole-plates are commonly of a circular or an oval form, one of the latter form being shown in Fig. 1, the section of rope being bent in forming the gasket to bring its squarely-cut ends snugly together to form a close joint 4.

The rope 3 of the packing material from which the gaskets are formed consists of an outer tube or inclosing case 5, preferably of india-rubber, holding immediately within it a fibrous tubular wrapper 6, of braided asbestos or cotton cloth, or it may be flax, hemp, or other fiber, the particular material of which the wrapper is made not being essential to the invention. Within the wrapper 6 is placed a leaden tube 7, the connection or contact between which tube and the wrapper being such that the tube is free to turn or to move freely longitudinally or endwise within the wrapper, this being an essential feature of the invention.

While giving weight and body to the gasket and a certain amount of stiffness and stability, the leaden tube 7 serves also to hold the gasket to or in the exact curved form given it when fitted to the manhole.

In Fig. 4 is shown the two ends of a section of the rope squarely abutted together and joined as in forming a gasket. In this form a short core-piece 8, commonly of lead, is employed within the body-tube 7, as shown, crossing the joint 10 between the ends of the rope and extending equally each way from said joint. The core-piece 8 is preferably tubular, as appears, and having a diameter such as to fill the body-tube 7 to hold the adjacent ends of the rope even and coaxial; but it is to be understood that I only in some cases use this core-piece or connector 8 in forming the joints for gaskets, the joint usually preferred and most commonly employed being shown in Fig. 1. In forming this joint the core-piece 8 is dispensed with, and instead the leaden body-tube 7 is slipped longitudinally through the outer portions of the rope, so as to project at one end of the rope-section, leaving a corresponding cavity at the opposite end. This shifting of the body-tube within the wrapper is easily effected on account of the said tube being left free to move within the wrapper when the rope is constructed as above stated, the tube being shifted after a section is cut from the rope and while straight or before it is bent to form the gasket.

In bringing the ends of the section of rope together to form the gasket the projecting end of the tube 7 is primarily inserted in the cavity within the wrapper 6 at the opposite end, and when the ends of the section meet to form the joint 4 the ends of the tube 7 will likewise abut and form a joint at 9 distant from the joint 4 and not coinciding therewith. This makes a perfect and permanent joint for the gasket, and it is easily and conveniently made and without the use of any extra piece separate from the section of rope itself.

The india-rubber inclosing case 5 and the inclosed fibrous wrapper 6 are usually cemented together or otherwise joined so as to have no relative motion with each other. Each being both yielding and resilient causes the gasket to make a tight joint at the manhole when pressed by the upper plate or cap (not shown) well known and of common use with manholes, the plate 1 being formed with a concave seat or channel 11, Fig. 5, for receiving the gasket.

What I claim as my invention, and desire to secure by Letters Patent, is—

1. In packings for machinery a gasket for manholes, consisting of a rope body formed with an outer yielding casing, as of india-rubber, and a fibrous wrapper within the casing, and a flexible metallic tube, as of lead, within the wrapper, said casing and the wrapper being secured together and the tube being free to move endwise within the wrapper.

2. A rope of packing consisting of a flexible outer casing, a flexible wrapper within the casing, and a flexible tube within the wrapper, the casing and the wrapper being rigidly connected and the tube being free to move endwise within the wrapper.

3. A gasket for manholes, the same being a section of rope bent to form and having an outer yielding tubular casing, and a tubular fibrous wrapper within the casing, and a leaden tube within the wrapper, the casing and the wrapper being relatively immovable and the lead tube being adapted to be moved longitudinally within the outer body and to project at its end.

4. A gasket-packing for openings such as manholes, consisting of a section of rope of packing cylindrical in cross-section having a tubular casing of india-rubber and within it a braided tubular wrapper connected immovably with the said casing, and a leaden tube within the wrapper and free to move endwise therein, the rope-section being bent to form the gasket with its opposite ends abutting, and means for securing said ends together.

5. A packing-gasket consisting of a rope body having a flexible outer casing, and a wrapper within the casing of material different from that of the casing, a leaden tube free to move endwise within said wrapper, and a flexible tube within the wrapper, the whole being bent to bring the ends of the rope body together, the joint between the ends of the said tube being out of coincidence with the joint between the ends of the outer casing and the wrapper.

6. A manhole formed with a rest or seat, in combination with a packing-gasket with joined ends upon said seat with its ends abutting and consisting of an outer flexible casing, a flexible wrapper within and filling the casing, and a flexible tube within the wrapper and free to move endwise therein one end of the said tube passing the joint between the ends of the body of the gasket.

In witness whereof I have hereunto set my hand, this 19th day of May, 1906, in the presence of two subscribing witnesses.

OLIN J. GARLOCK.

Witnesses:
S. D. VAN ALSTINE,
A. M. WHITMORE.